Feb. 3, 1948. E. N. McGREW 2,435,317
INSECT TRAP
Filed Oct. 20, 1943 2 Sheets-Sheet 1

Inventor
EDWARD N. McGREW

Feb. 3, 1948. E. N. McGREW 2,435,317
INSECT TRAP
Filed Oct. 20, 1943 2 Sheets-Sheet 2
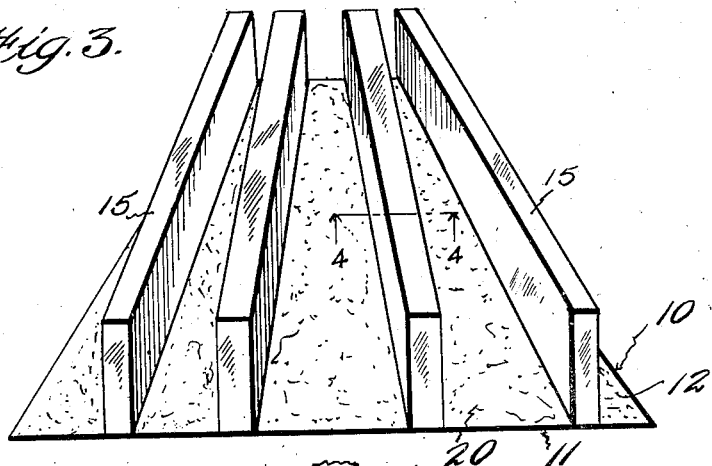
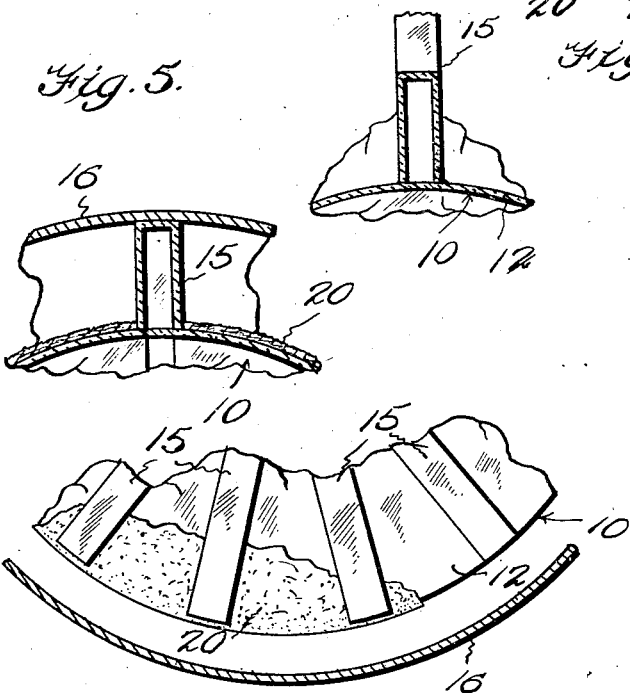
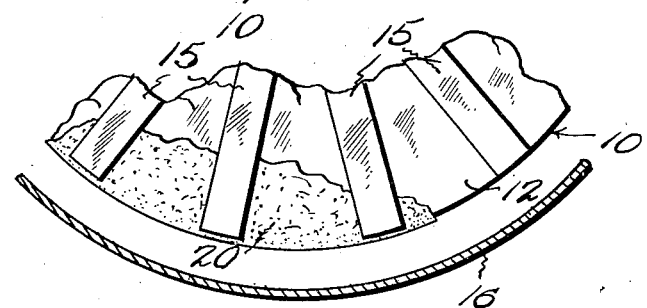
Inventor
EDWARD N. McGREW Patented Feb. 3, 1948

2,435,317

UNITED STATES PATENT OFFICE 2,435,317

INSECT TRAP

Edward N. McGrew, Fort Smith, Ark.

Application October 20, 1943, Serial No. 507,034

1 Claim. (Cl. 43—121)

This invention relates to insect traps and has for one of its objects the production of a simple and efficient insect trap which is so constructed as to deflect odors, shield an unpleasant sight, and provide a space beneath the trap for roaches and other insects to travel to reach the opening within the inner container of the trap.

A further object of this invention is the production of a trap for insects and the like, which is provided with an inner container having a slick inner face to prevent insects from climbing out after once entering the trap, and which is also provided with runways having traction means to facilitate the entrance of insects into the inner container.

Other objects and advantages of the present invention will appear throughout the following specification and claim.

In the drawings:

Figure 3 is a side elevational view of the inner container showing the corrugations which define the spaced runways;

Figure 4 is a transverse fragmentary sectional view taken on line 4—4 of Figure 3;

Figure 5 is a horizontal fragmentary sectional view taken through the outer covering and inner container and one of the spacing ribs of the inner container covering;

Figure 6 is a horizontal fragmentary sectional view taken on line 6—6 of Figure 2.

Figure 1:
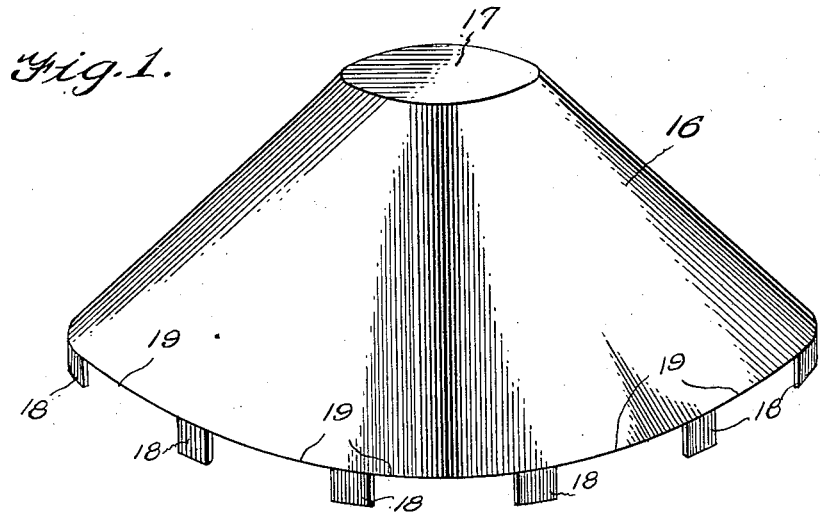
Figure 1 is a perspective view of the trap showing the exterior thereof.

By referring to the drawings, it will be seen that 10 designates the inner container which is provided with a closed bottom 11 and an inclined wall 12 defining a body in the shape of a frustrum of a cone having an opening 13 at its upper end. A bait 14 is adapted to be mounted within the inner container 10 and preferably rests upon the bottom 11 in the position shown in Figure 2 of the drawings. This inner container 10 is provided with corrugations or ribs 15 which are molded or formed integral with the body of the container and this container 10 is preferably made of glass or other suitable material having a slick or smooth inner face of the wall 12. The ribs or corrugations 15 may be formed in any suitable or desired shape and may be formed integral with or constructed as a separate part affixed or secured in any suitable or desired manner to the outer face of the inclined wall 12.

Figure 2:
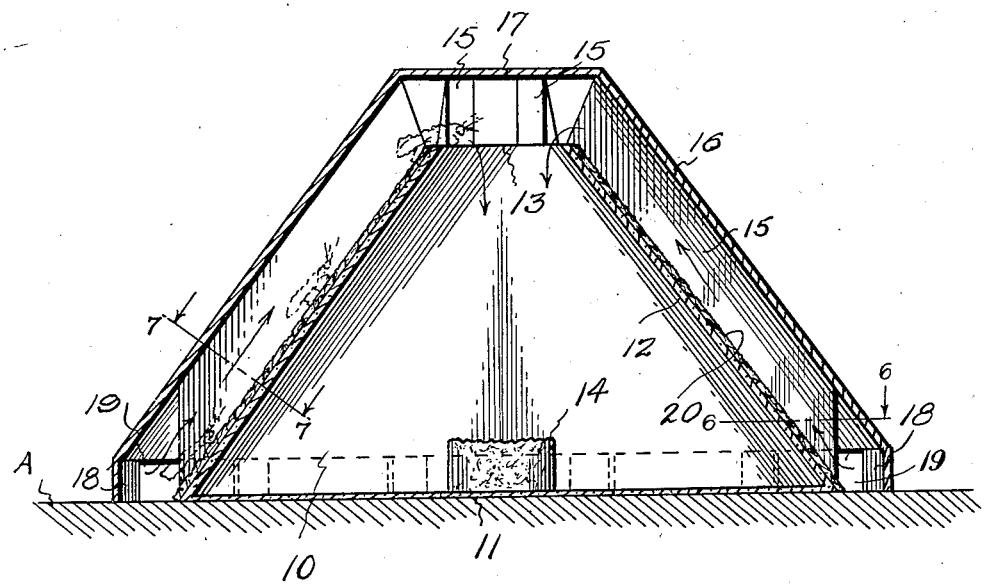
Figure 2 is a central vertical sectional view of the trap.
Figure 7:
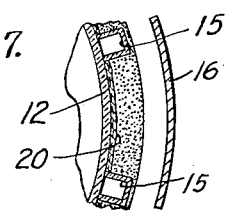
Figure 7 is a fragmentary horizontal view in section taken on line 7—7 of Figure 2.

An outer cover or housing 16 is adapted to fit over and enclose the inner container 10 and this outer housing or cover 16 is preferably formed of metal, paper, cardboard, or other suitable material to provide a shield to prevent the contents of the trap from being seen by an observer. This outer cover or housing 16 is in the shape of a frustrum of a cone, and is arranged to be spaced from the inner container 10 for a suitable distance by resting upon the outer faces of the corrugations or ribs 15, as shown in Figure 2, and also shown in Figure 5. The outer cover 16 is also provided with a flat top 17 at its upper end which is arranged in spaced relation to the opening 13 of the inner container 10. The cover or housing 16 is provided with depending tongues 18 formed around its lower edge, which tongues extend in a vertical plane and are arranged in spaced relation to define entrance openings 19 therebetween. These tongues 18 constitute legs for supporting the lower edge of the cover or housing 16, and the lower edges of these tongues or legs 18 are adapted to rest upon a suitable support such as a floor, table or other supporting means A. The entrance openings 19 between the tongues or legs 18 will, therefore, direct roaches or other insects into the trap and these openings 19 will provide gateways for the entrance of the insects.

I preferably place a traction mat or suitable traction material 20 upon the outer inclined face of the wall 12 between the corrugations or ribs 15, which traction material may be of any suitable or desired nature such as felt, fabric, or any roughened material which roaches or other insects may firmly grip to facilitate the climbing of the inclined wall 12 toward the opening 13 from the entrance openings 19.

It should be noted that the lower ends of the ribs 15 extend vertically relative to the horizontal bottom 11 of the inner container 10 and that the outer cover 16 overhangs the lower ends of the bottom 11 of the container 10. Because of this structure, a runway is provided which is shielded and unobstructed and extends entirely around the bottom 11 of the container. The outer cover therefore need not be exactly placed so that the entrance openings 19 may register with the inclined runways which extend between the ribs 15. This arrangement will permit the parts to be rapidly assembled without the necessity of using extreme care to see that certain parts register in order that the trap may operate. This is especially important where the cover 16 is removable for refilling or cleaning the trap.

As stated above, the container 10 is preferably made of glass or other material, and affords a smooth inside surface. This smooth inside surface by extending upwardly on an incline prevents the escape of the trapped roaches or other insects, but it should be understood that the container may be of various shapes and sizes with the opening 13 formed at the top to provide an entrance for the roaches where they will fall into the container 10 to obtain access to the bait 14. The traction element 20 provides a footing upon the outer face of the inner container 10, and this covering 20 may be of the same material as the outer cover 16, or of any material which would provide a suitable traction.

The top or outer cover or housing 16 provides a deflector of odors for the attraction of insects toward the bait, as well as an entrance for the insects and an apparent habitat. The cover 16 also shields an unpleasant sight and provides a space beneath the cover for the roaches to travel to the opening 13 due to the spacing of the cover 16 from the inner container 10, as described. The ribs 15 while providing a spacing means between the cover and the inner container will also define separate pathways leading from the entrance openings 19 toward the opening 13 formed in the top of the inner container 10. The bait 14 should give off a slight odor sufficient to attract the roaches or other insects.

It should be understood that certain detail changes may be employed in the construction of the device without departing from the spirit of the invention, so long as such changes fall within the scope of the appended claim.

Having described the invention, what I claim is:

A trap of the class described comprising an inner container in the shape of a frustrum of a cone having a restricted opening in the top thereof and a closed horizontal bottom, the container being adapted to contain a bait, ribs formed upon the outer face of the inner container and extending from the bottom to the opening formed in the top of the container, each rib having a vertical wall at its lower ends extending substantially at right angles to said horizontal bottom, a removable cover enclosing the container resting upon said ribs and having a top overlying and spaced from the opening formed in the top of the container, the space between the ribs constituting upwardly inclined runways leading from the bottom of the container to the top opening thereof, the cover having an open lower end extending beyond the vertical walls of the ribs thereby providing an unobstructed shielded runway entirely around the bottom of the container communicating with the lower ends of the upwardly inclined runways, and depending spaced tongues supporting the lower edge of the cover and spaced from the lower edge of the bottom and spaced from the vertical walls of the ribs, the spaced tongues defining entrance openings to the runway.

EDWARD N. McGREW.

REFERENCES CITED

The following references are of record in the file of this patent:

UNITED STATES PATENTS

| Number | Name | Date |
|---|---|---|
| 134,444 | Stell | Dec. 31, 1872 |
| 501,350 | Kuntz | July 11, 1893 |
| 862,079 | Lenthier | July 30, 1907 |
| 1,748,449 | Hughett | Feb. 25, 1930 |